US007807941B2

(12) United States Patent
Hildebrand et al.

(10) Patent No.: US 7,807,941 B2
(45) Date of Patent: Oct. 5, 2010

(54) METHOD AND DEVICE FOR PRODUCING A CAVITY IN A WORKPIECE

(75) Inventors: Peter Hildebrand, Pfronten (DE); Michael Kuhl, Füssen (DE); Martin Reisacher, Kempten (DE); Udo Stürmer, Pfronten (DE)

(73) Assignee: Sauer GmbH, Stipshausen (DE)

( * ) Notice: Subject to any disclaimer, the term of this patent is extended or adjusted under 35 U.S.C. 154(b) by 1079 days.

(21) Appl. No.: 10/552,195

(22) PCT Filed: Apr. 16, 2004

(86) PCT No.: PCT/EP2004/004054

§ 371 (c)(1), (2), (4) Date: Jun. 22, 2006

(87) PCT Pub. No.: WO2004/091844

PCT Pub. Date: Oct. 28, 2004

(65) Prior Publication Data

US 2006/0249489 A1 Nov. 9, 2006

(30) Foreign Application Priority Data

Apr. 16, 2003 (DE) ................. 103 17 579

(51) Int. Cl.
B23K 26/38 (2006.01)
(52) U.S. Cl. ............... 219/121.68; 219/121.69
(58) Field of Classification Search ........... 219/121.69, 219/121.68, 121.7, 121.71; 216/65
See application file for complete search history.

(56) References Cited

U.S. PATENT DOCUMENTS 3,867,217 A * 2/1975 Maggs et al. ............. 216/65
5,225,650 A * 7/1993 Babel et al. ............ 219/121.69
5,331,131 A * 7/1994 Opdyke ................. 219/121.69
5,782,253 A    7/1998 Cates et al. .................. 134/105
5,833,759 A * 11/1998 Haslow et al. ................. 216/65
6,043,452 A *  3/2000 Bestenlehrer .......... 219/121.62
6,407,361 B1* 6/2002 Williams ............... 219/121.69
2002/0040893 A1* 4/2002 Arai et al. .............. 219/121.71

FOREIGN PATENT DOCUMENTS

| CN | 1048996 A  | 2/1991 |
| DE | 3923356 C1 | 2/1991 |
| EP | 0 407 969 A1 | 1/1991 |
| JP | 4 237553   | 8/1992 |

(Continued)

OTHER PUBLICATIONS

Kobayashi Akio, *Patent Abstracts of Japan*, Publication No. 06031745, Publication Date Feb. 8, 1994, Application Date Jul. 15, 1992, Application No. 04187970 (1 page).

(Continued)

*Primary Examiner*—Geoffrey S Evans
(74) *Attorney, Agent, or Firm*—Wood, Herron & Evans, LLP

(57) ABSTRACT

During the production of a swage in a workpiece in which material is removed in layers by means of a laser beam the side walls of the swage are processed by means of a laser beam and/or a processing means and/or ultrasonic waves.

22 Claims, 4 Drawing Sheets

FOREIGN PATENT DOCUMENTS

| | | | |
|---|---|---|---|
| JP | 7-9171 A | * | 1/1995 |
| JP | 9-277272 A | * | 10/1997 |
| JP | 11170077 A | * | 6/1999 |
| JP | 11-340604 A | | 12/1999 |
| JP | 2001-287368 A | | 10/2001 |
| JP | 2002-292487 A | | 10/2002 |
| JP | 2002-335063 A | | 11/2002 |
| WO | WO 00/18535 | | 4/2000 |
| WO | WO 00/19167 | | 4/2000 |

OTHER PUBLICATIONS

EPO, *International Preliminary Examination Report with Annexes*, PCT/EP2004/004054, May 31, 2005 (19 pages).

EPO, *International Search Report*, PCT/EP2004/004054, Jan. 26, 2005 (7 pages).

* cited by examiner

METHOD AND DEVICE FOR PRODUCING A CAVITY IN A WORKPIECE

FIELD OF THE INVENTION

The invention relates to a method and an apparatus for the production of a swage in a workpiece in accordance with the preambles of the independent claims. Such a method and device are known from the WO 00/19167 and the WO 00/18535 by the same applicant.

BACKGROUND OF THE INVENTION

The methods and devices mentioned particularly relate to prototyping and mould-making, in which moulds and particularly swages are to be produced which are comparatively small and have to be produced with high accuracy.

In case of the method for producing a swage by means of a laser beam a laser beam is guided along the accessible work surface of a workpiece in the accessible work area in accordance with digitally stored shape data. This may, for example, be effected in a meandering or hatching manner. The laser power and other parameters are set so that the impinging laser beam partly evaporates the material at the position of incident so that it is removed from the surface. In this way the laser can, under an appropriate control, remove layers of material from the surface so that gradually a swage is produced. The guidance of a laser and the adjustment or control of the other parameters of the process is carried out with reference to the digitally stored data.

FIG. 1A is a schematic view of the above procedures. 11 designates a workpiece shown in cross section. 12 schematically indicates the laser beam emitted by a laser head 13. 17 schematically indicates the position of incident of the laser beam on the current bottom of the swage. 18 schematically indicates the individual layers which have already been removed. 19 indicates the desired final shape of the swage in broken lines. 20 indicates the current bottom of the swage, i.e. the presently exposed surface of the swage. 15 designates the side walls of the swage. The illustration of FIG. 1A is so that the side wall 15 and the swage bottom 20 can be well distinguished due to their angular correlation. This need not always be the case. Within the framework of the present application the term side wall generally identifies an accessible surface inside the swage positioned closer to the laser head 13 than the swage bottom 20 in its z-coordinate. 14 designates the workpiece table. Further FIG. 1A shows the used coordinate definitions. The plane of the drawing is the x-z-plane. The y-coordinate is perpendicular to it (and indicated diagonally). The work window 10 of the laser beam is therefore located in the x-y-plane.

FIG. 1B shows the conditions which may develop on the side walls during the removal of material by means of a laser beam in an enlarged scale. The laser beam 12 which is conic due to its focus is guided over the swage bottom 20 in the direction of the arrow 21. The evaporated, molten and sprayed material, particularly metal, is symbolised by the "jets" 23. Particularly the sprayed material is partly deposited in the swage again. Such re-deposited material is designated by the numerals 16 (the deposit on the side wall 15) and 22 (the deposit on the swage bottom 20). Deposits 22 on the swage bottom 20 are generally harmless since they are worked over during the next passage of the laser, and in particular they are removed in a controlled manner if a depth control is carried out. This does not apply to the deposits on the side wall 15. Since the side walls are not a priori worked over by the laser beam the deposits 16 remain on the side wall. In addition, they tend to grow: The material is sprayed up to a first, incidentally formed deposit from below (from the swage bottom 20) and is deposited there. The deposit thus grows in the direction towards the swage bottom 20. It also grows in the direction towards the inside of the swage as well as in the circumferential direction of the swage. The deposit then resembles a heap cone. Such deposits may significantly deteriorate the quality of the produced swage.

SUMMARY OF THE INVENTION

It is the object of the invention to provide a method and a device for the production of a swage in a workpiece which enable the production of a swage with deposit-free side walls.

Said object is solved by the features of the independent claims. The dependent claims relate to preferred embodiments of the invention.

According to the invention the side walls of the swage are also treated with a laser beam. The process may be preceded by a measurement of the side walls, the treatment of the side walls then being carried out in accordance with the measurement results. On the other hand the treatment of the side walls may be carried out "universally" without a previous measurement.

According to one embodiment "side wall" may be understood to define the limitation of the swage with the exception of the current swage bottom. The term swage bottom defines the surface serving as the base for a further removal of material in the direction of the depth of the swage.

Instead of or in addition to the use a laser beam the side walls may also treated with other processing means, e.g. an etching reagent or a particle blast, or by using dry ice and/or ultra sonic waves.

The treatment of the side walls may be carried out on the complete depth of the swage or on part of it and on the whole circumference of the swage or on part of it.

The treatment of the side walls may be carried out with a reduced laser power and/or defocused at the position of impingement.

The treatment of the side walls may, in particular, serve to remove material re-deposited on the existing side walls during the swage formation, it may, however, also serve other purposes. The side wall to be treated in accordance with the invention may be inclined in a higher or lower degree. The transition to the current swage bottom may be smooth in case of very flat inclinations. When the treatment of the side walls is discussed this may include a treatment of the swage bottom, it may, however, also mean that only the side wall is treated.

BRIEF DESCRIPTION OF THE DRAWINGS

Individual embodiments of the invention will be described below with reference to the drawings in which.

DETAILED DESCRIPTION OF THE PREFERRED EMBODIMENT

Figures 1A, 1B:
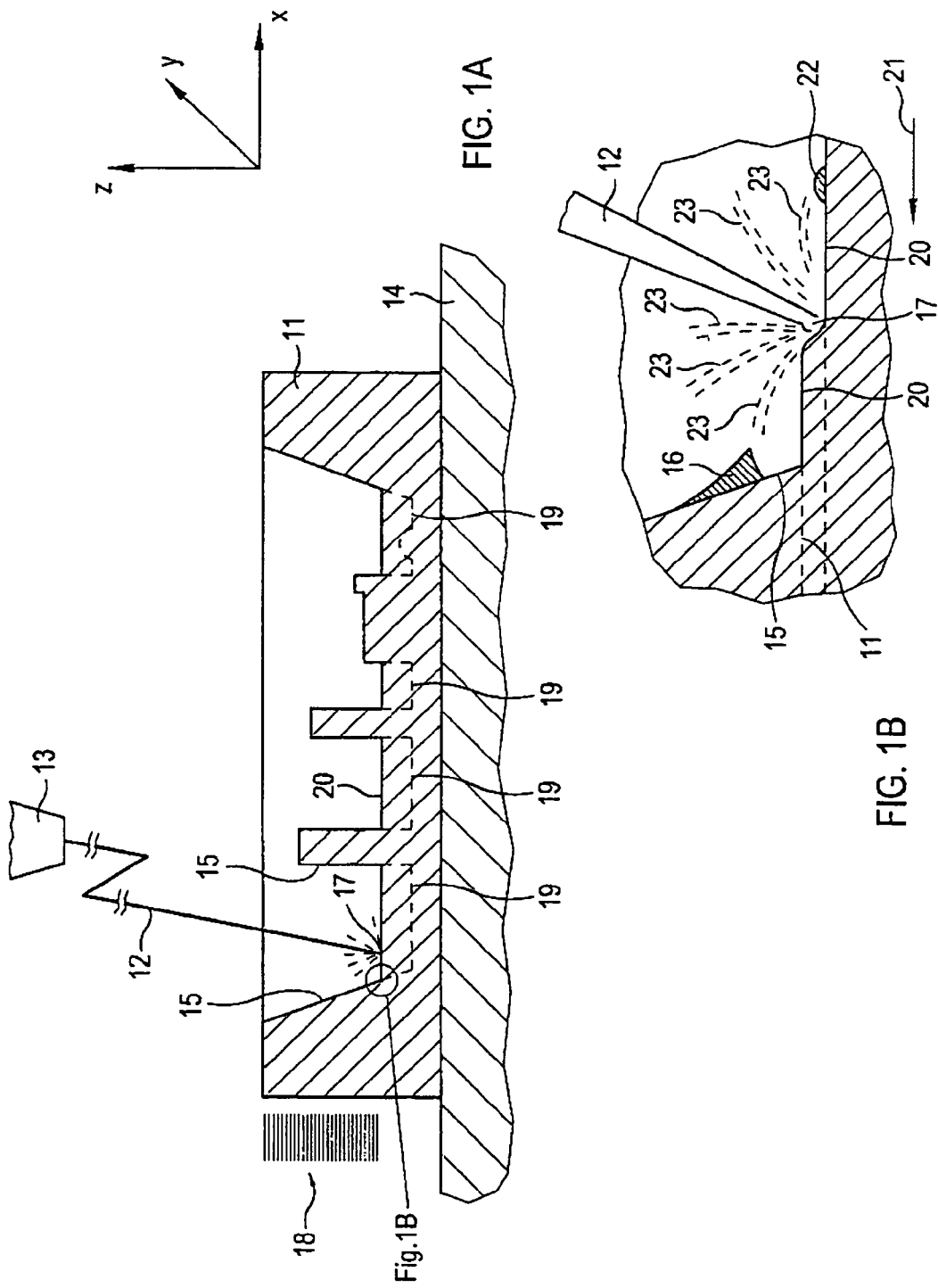
FIGS. 1A and B show the state of the art.
Figure 2:
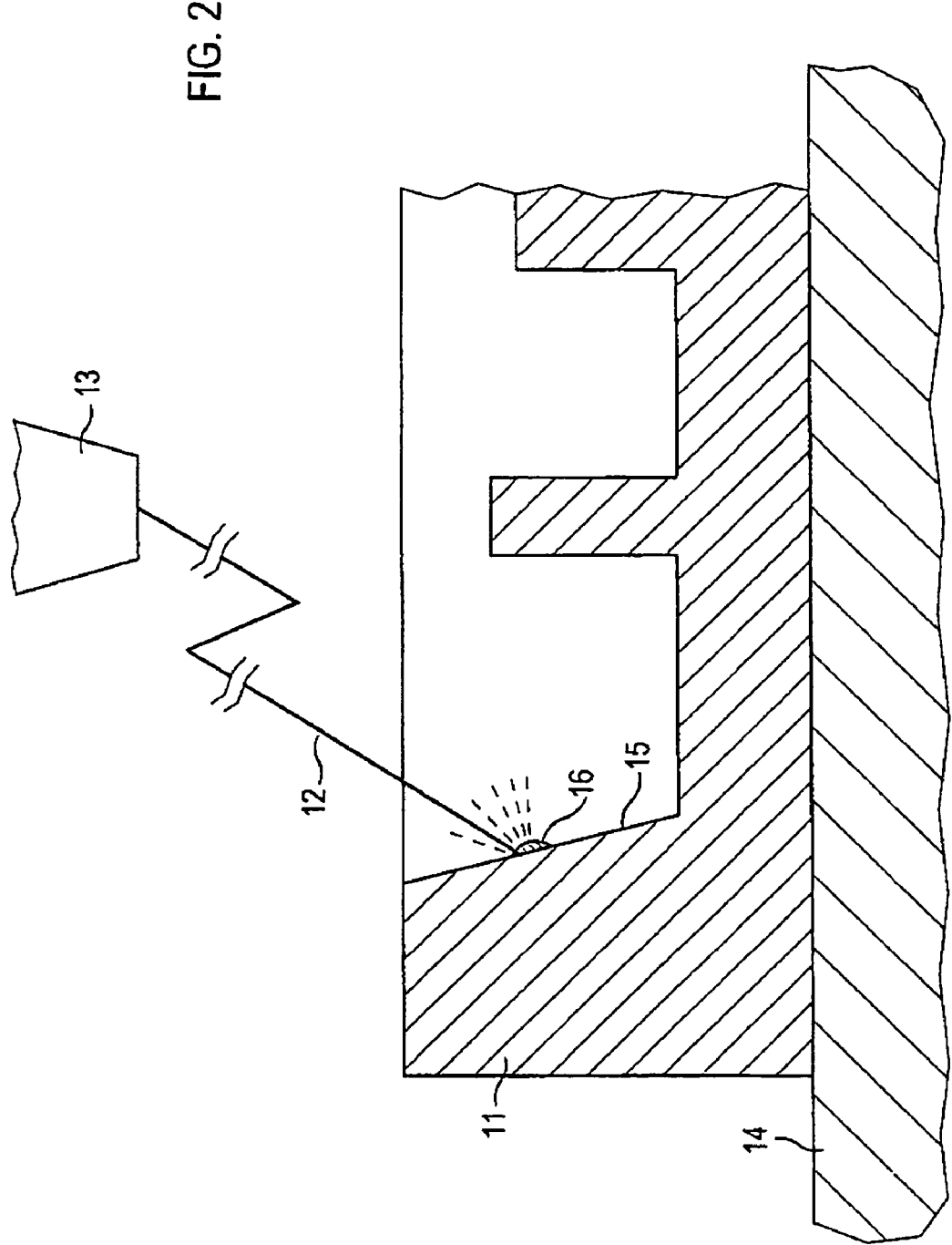
FIG. 2 shows the approach according to the invention.

FIG. 2 is a schematic view of a workpiece similar to the one shown in FIG. 1A. The items which are identical to the ones shown in FIG. 1 are designated by the same numerals. According to the drawing the laser beam 12 impinges on the side wall 15. A deposit 16 is assumed to exist under the laser beam 12 and will be removed by the laser beam 12 so that the side wall reassumes its originally intended shape.

It has been found that the deposits 16 may have other characteristics than the original material of the workpiece 11 when treated with a laser beam or another processing means, like a particle blast, an etching reagent, dry ice or ultra sonic waves. In particular the redeposited material 16 is less "resistant" against the laser beam 12 or a processing means than the original material of the workpiece 11. This fact may be made use of by performing the treatment of the side walls so that the "full material" (i.e. the material of the workpiece 11 originally left as the side wall 15) is not further removed by the laser beam 12. This can be achieved in different ways, for example by guiding the laser beam across the surface with a higher speed so that less energy is radiated onto each unit of area, or by reducing the laser power or by making the laser beam impinge on the side wall out of focus. The latter method is preferred. However, a combination of the above measures may be chosen. If the work is performed with the laser beam out of focus the predetermined position to be treated by the laser may be intra-focal (point of impingement between laser head 13 and focus point of the laser beam) or extra-focal.

The control of the laser 12 or the laser head 13 for the treatment of the side walls is performed in accordance with the swage data by means of a controller. The controller has access to the swage data so that particularly the coordinates of the side wall may be determined point-wise according to the x-, y- and z-coordinates.

The treatment of the side walls may be carried out once or a plurality of times during the production of a swage. A side wall treatment cycle may, for example, be carried out after 10 (generally after n, n≧1), layers have been removed from the swage bottom 20, respectively. It is also feasible to perform the treatment of the side walls only once at the end of the production of the swage.

The treatment of the side walls may be performed over the complete depth of the swage (i.e. from the swage bottom 20 up to the upper edge of the swage) or only over a portion. In the circumferential direction the treatment of the side walls may also be performed over the complete surface or just over a section. The question which parts of the side wall are to be treated may, for example, depend on how much the respective side wall tends to attract deposits. Deposits have a stronger tendency to form on steep side walls than on very flat ones. Therefore the inclination of the wall may serve as a criterion for the question of the side wall treatment.

The treatment of the side walls may be performed so that the side wall is completely worked over, i.e. surface-covering. However, the swage may also be measured and a treatment of the side walls may only be performed where deposits are found on the side walls during the measurement. The measurement may be carried out using the depth sensor unit of the laser treatment head 13 or an external measurement device. In particular it is possible to completely work the side wall over (in the desired range) in a first treatment cycle and to evaluate the data acquired by means or the depth sensor unit correspondingly. When it is found that large deposits existed on a side wall and that they still exist after the first treatment of the side walls a possible second work-over may immediately follow. The depth sensor unit may be designed so that it analyses the process light and draws conclusions relating to the working depth from the results.

During the treatment of the side wall the relative position of the laser head 13 with respect to the workpiece 11 may be set differently than during the removal of the material in layers. In particular the setting can be carried out so that the laser beam impinges on the side wall more "perpendicular".

According to FIG. 2 this could be realised by shifting the laser head 13 to the right or the workpiece 11 together with the table 14 to the left.

Figure 3:
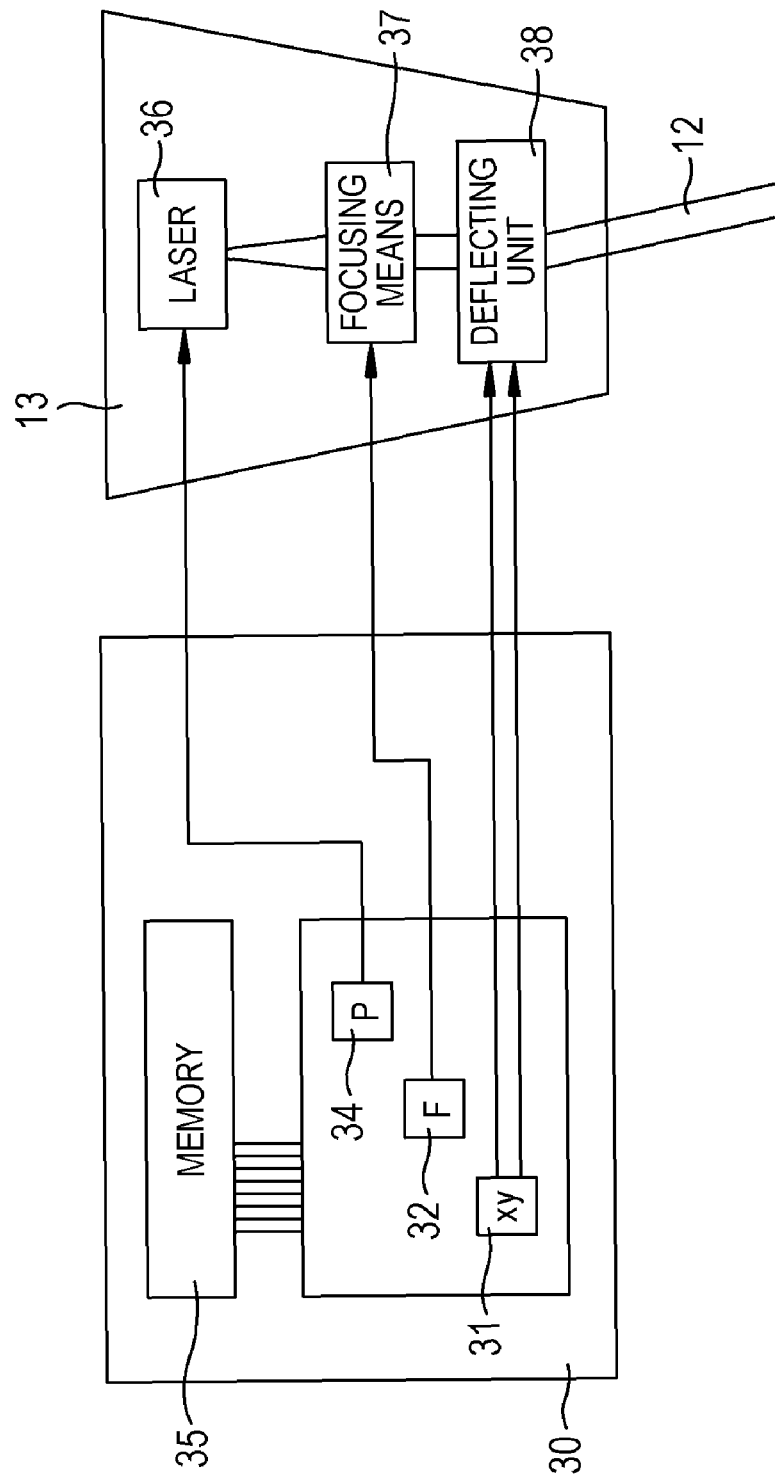
FIG. 3 shows the control according to the invention.

A device for producing a swage is schematically shown in FIG. 3. Here the laser head 13 emitting the laser beam 12 is driven by a control means 30. The laser head 13 is provided with a laser 36, a focusing means ("z-shifter") 37 and a deflecting unit 38 by which the laser can by guided over the surface of the swage in the x- and y-directions. These components are driven by the control means 30. The control means 30 comprises a memory 35 in which the swage data may be stored, in particular, in a vector- or position-related or combined manner. With reference to the data stored in the memory 35 the control signals for the deflecting unit 38 are determined by an x-y-control 31, the control signals for the focusing means 37 are determined by the focusing control means 32, and the control signals for the laser 36 are determined by the power control 34. When the treatment of the side walls is to be controlled the laser beam 12 is guided along the side walls of the swage by the deflection control means 31 using the deflecting unit 38. At the same time the defocusing by suitably controlling the position of the focus point particularly in the z-direction can be effected by the focusing means 37 using the focus control 32, or the output of the laser 36 may be adjusted by means of the power control 34.

Figure 4:
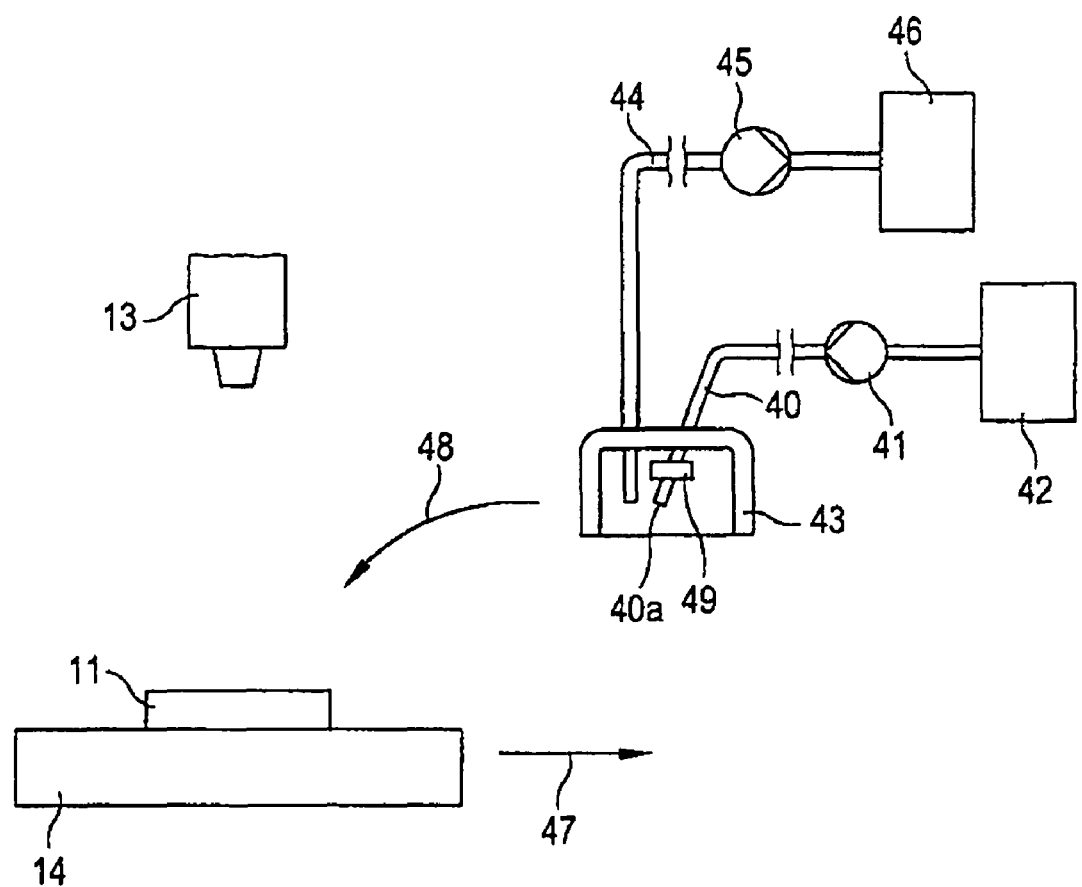
FIG. 4 is a schematic view of a device for applying a processing means during the treatment of the side walls.

A method according to which the treatment of the side walls is performed using a processing means such as a particle blast and/or an etching reagent and/or dry ice and/or ultrasonic waves will be described below. It may be applied instead of or in addition to the treatment of the side walls with a laser beam. In this connection a device is schematically shown in FIG. 4, particularly the numerals 40-46.

The processing means may be a particle blast, such a sand blast having a suitable (intermediate) grain size, or an etching reagent, e.g. $H_3PO_4$, and/or dry ice. It may be stored in a container 42 and supplied to the location of the swage through a conduit 40 by means of a feeding means 41, e.g. a pump. The conduit 40 and particularly its front orifice 40a may be inserted into the produced (partial) swage.

If dry ice (particularly $CO_2$ in a solid state of aggregation) is used, a jet, particularly a gas or air jet, containing particles of dry ice may be guided along the surfaces to be worked over or the side walls. The dry ice particles may have an average diameter in a range of 1 to 4 mm. During the impact on the surface to be processed or shortly before it the dry ice evaporates, and the energy set free leads to the removal of the deposits to be removed.

If ultrasonic waves are used for treating or cleaning the side walls the workpiece can be immersed into a liquid bath. The treatment with ultrasonic waves can be carried out independently or in addition to the other measures.

The relative position (x/y/z) and/or angular position of the conduit 40 and particularly its front orifice 40a with respect to the workpiece 11 may be adjustable and/or automatically guidable along the surfaces of the swage, particularly the side wall or parts of it, during the treatment of the side walls. For this purpose an adjustment means 49 may be provided which sets or moves along the relevant positions in an automatically controlled manner during the process. Since the processing means usually acts in a broader spatial distribution than a laser beam 12 the adjustment of the conduit 40 may be coarser than the adjustment of the laser beam. A single adjustment of the position and/or angular position before the treatment of the side walls or a single movement around the circumference of the swage, i.e. around the existing side wall, may be sufficient.

During the treatment of the side wall at least the machine, preferably also parts of the workpiece 11, may be shielded from excessive processing means. For this purpose, for example, a shielding means 43 may be provided by which the processing means is at least kept away from the device. It may be bell- or bowl-shaped, and it may be placed on the workpiece surface during the treatment of the side walls. The adjustment means 49 may be provided within the shielding means 43.

During the treatment of the side walls excessive processing means may be removed, particularly removed by suction. For this purpose suction means comprising, for example, a pipe 44, a pump 45 and a receiving container 46 may be provided.

For the treatment of the side walls the workpiece 11 may, in particular, be repeatedly and automatically moved out of the work area of the laser beam 12 and into the vicinity of the conduit 40 of the processing means, preferably together with the table 14, as indicated by the arrow 47. For the treatment of the side wall, however, the conduit 40 of the processing means may also be moved into the work area of the laser beam 12 and towards the workpiece 11, as indicated by an arrow 48.

The treatment of the side walls is preferably performed several times during the production of the swage, for example each time after a certain number of layers or a certain volume has been removed or after a wall surface of a certain size has been exposed. The complete changeover between the production of the swage and the treatment of the side walls including a suitable positioning of the workpiece and/or the conduit 40, the cover 43 and the suction means 44-46 is preferably performed automatically.

The device for the production of a swage according to the invention is particularly intended to perform the method for the production of a swage according to the invention.

Having described the invention, we claim:

1. Method for the production of a swage in a workpiece, comprising:
    removing material of the workpiece in a layer-wise manner by a laser beam,
    characterised in that
    the side walls of the swage are treated by means of a laser beam and/or a processing means after several layers have been removed.

2. Method according to claim 1, characterised in that the side walls are treated over all or part of the depth of the swage and/or all or a part of the circumference of the swage.

3. Method according to claim 1, characterised in that the side wall is measured before the treatment and that the treatment is performed in accordance with the measurement.

4. Method according to claim 1, characterised in that the treatment of the side wall is performed with a reduced power of the laser beam and/or defocused at the treated position and/or with a higher beam guidance speed and/or with a reduced energy input per surface unit.

5. Method according to claim 1, characterised in that the treatment of the side wall is performed automatically in accordance with swage data.

6. Method according to claim 1, characterised in that the treatment of the side wall is performed with a relative positioning of the workpiece and the laser source which is different from the relative positioning during the material removal in layers.

7. Method according to claim 1, characterised in that the processing means comprises at least one of a particle blast, an etching reagent dry ice, and/or ultrasonic waves.

8. Method according to claim 7, characterised in that at excessive processing means is shielded during the treatment of the side walls.

9. Method according to claim 8, characterised in that the excessive processing means is removed, particularly removed by suction, during the treatment of the side walls.

10. Method according to claim 7, characterised in that the processing means is supplied to the vicinity of the swage by means of a conduit.

11. Method according to claim 10, characterised in that the position and/or angular position of the conduit relative to the workpiece is adjustable and/or guidable during the treatment of the side wall.

12. Method according to claim 11, characterised in that the position and/or angular position of the conduit relative to the workpiece is adjusted and/or guided in accordance with swage data and/or in accordance with measured depth data.

13. Method according to claim 10, characterised in that the workpiece is automatically removed from the work area of the laser beam and moved to the vicinity of the conduit of the processing means for the treatment of the side walls.

14. Method according to claim 10, characterised in that the conduit of the processing means is moved into the work area of the laser beam for the treatment of the side walls.

15. Device for the production of a swage, comprising
    a laser treatment means
    a processing means;
    a feeding means for the processing means; and
    a control means for the laser treatment means,
    wherein the control means is configured to drive the laser treatment means or the feeding means for the processing means for treating the side wall of the swage such that a plurality of layers of material is removed and then the side wall is treated.

16. Device according to claim 15, characterised by a focusing means defocusing the laser treatment means at the work area during the treatment of the side wall.

17. Device according to claim 15 or 16, characterised by a power control means reducing laser power during the treatment of the side wall.

18. Device according to claim 15, characterised in that the processing means is a particle blast and/or an etching reagent and/or contains dry ice.

19. Device according to claim 15, characterised in that the feeding means comprises a conduit for the particles of the particle blast and/or the etching reagent and/or the dry ice.

20. Device according to claim 15, characterised by a shielding means shielding at least the device from the processing means.

21. Device according to claim 15, characterised by a suction means for removing excessive processing means by suction.

22. Device according to claim 15, characterised in that the control means is adapted to drive an ultrasound means for treating the side wall of the swage.

* * * * *

UNITED STATES PATENT AND TRADEMARK OFFICE
CERTIFICATE OF CORRECTION

| | | |
|---|---|---|
| PATENT NO. | : 7,807,941 B2 | Page 1 of 1 |
| APPLICATION NO. | : 10/552195 | |
| DATED | : October 5, 2010 | |
| INVENTOR(S) | : Peter Hildebrand et al. | |

It is certified that error appears in the above-identified patent and that said Letters Patent is hereby corrected as shown below:

In column 1, line 29, change "the process is carried out" to --the process are carried out--.

In column 2, lines 30-31, change "the use a laser beam the side walls may also treated" to --the use of a laser beam the side walls may also be treated--.

In column 2, line 42, change "during the swage formation, it may, however, also serve other purposes." to --during the swage formation; it may, however, also serve other purposes--.

In column 2, line 47, change "this may include a treatment of the swage bottom, it may, however," to --this may include a treatment of the swage bottom; it may, however,--.

In column 3, line 61, change "so that it analyses the process light" to
--so that it analyzes the process light--.

In column 4, line 34, change "such a sand blast having" to --such as sand blast having--.

In column 6, line 3, claim 7, change "an etching reagent dry ice, and/or ultrasonic waves." to --an etching reagent, dry ice, and/or ultrasonic waves.--.

In column 6, line 4, claim 8, change "characterised in that at excessive processing means" to --characterised in that excessive processing means--.

In column 6, line 28, claim 15, change "Device for the production of a swage, comprising" to --Device for the production of a swage, comprising:--.

In column 6, line 29, claim 15, change "a laser treatment means" to --a laser treatment means;--.

Signed and Sealed this
Twenty-eighth Day of December, 2010

David J. Kappos
*Director of the United States Patent and Trademark Office*